Oct. 17, 1961 S. MACOMBER 3,004,324
METHOD OF MAKING LAMINATED TUBULAR SECTION STRUCTURAL MEMBERS
Filed Nov. 25, 1958 3 Sheets-Sheet 1
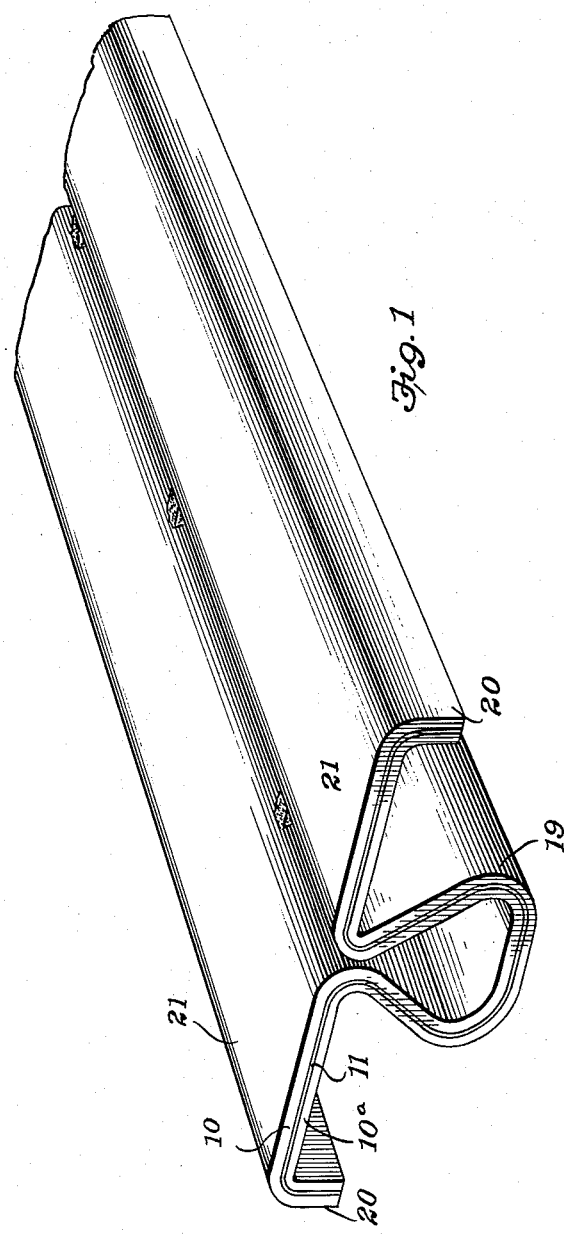
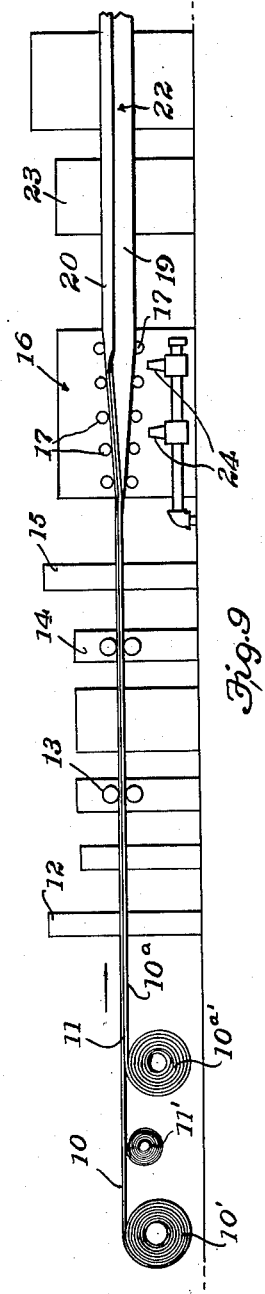
INVENTOR
Stanley Macomber,
BY Frease & Bishop
ATTORNEYS

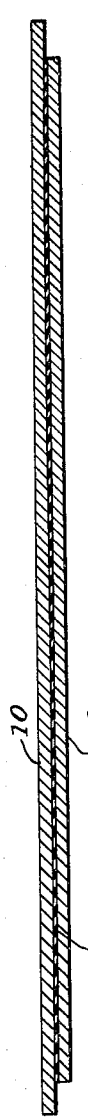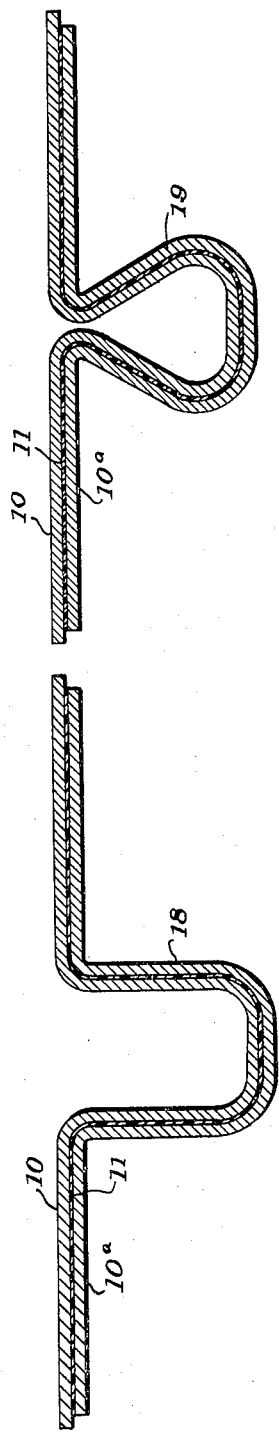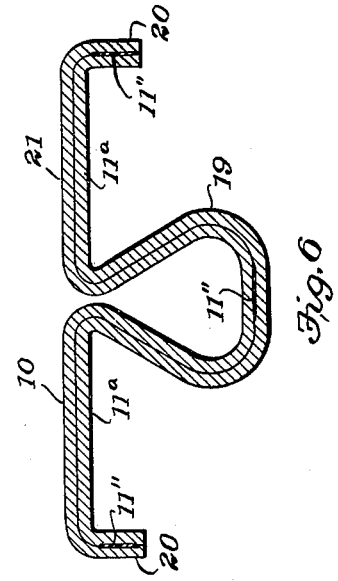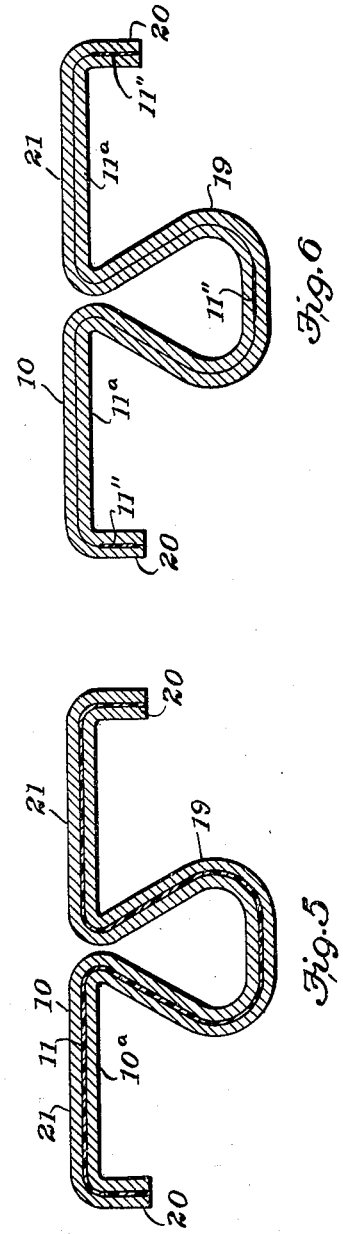

Oct. 17, 1961     S. MACOMBER     3,004,324
METHOD OF MAKING LAMINATED TUBULAR SECTION STRUCTURAL MEMBERS
Filed Nov. 25, 1958     3 Sheets-Sheet 3
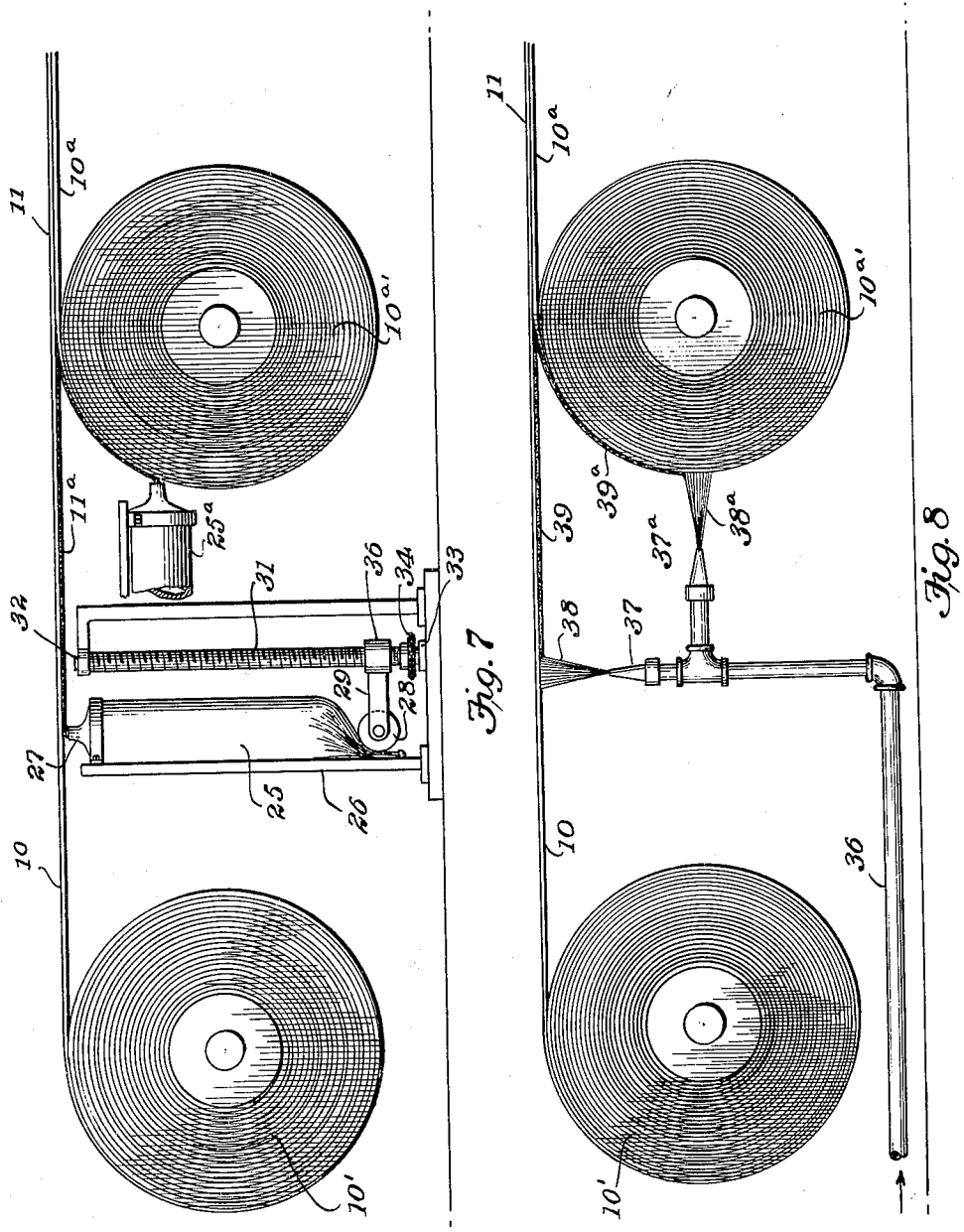
INVENTOR
Stanley Macomber
BY
ATTORNEYS

United States Patent Office 3,004,324
Patented Oct. 17, 1961

3,004,324
METHOD OF MAKING LAMINATED TUBULAR SECTION STRUCTURAL MEMBERS
Stanley Macomber, Canton, Ohio, assignor to Macomber, Incorporated, Canton, Ohio, a corporation of Ohio
Filed Nov. 25, 1958, Ser. No. 776,377
5 Claims. (Cl. 29—155)

The invention relates to the manufacture of laminated tubular section structural members formed of plural strips of steel, and this application is a continuation-in-part of my copending application, Serial No. 713,810, filed February 7, 1958.

Single ply tubular section structural members of the type referred to have been made for many years in accordance with my Patent No. 2,457,250, issued December 28, 1948. Such a structural member comprises an elongated strip of metal having its longitudinal central portion bent into a substantially triangular tubular "bulb," opposite edge portions of the strip being oppositely bent forming substantially flat flanges.

The dimensions of such structural members are limited by the gauge of the steel strips from which they are formed. For instance, permissible flange widths are limited to slightly over twenty times the gauge of the steel strip, and this requires that the terminal edges of the flanges be reinforced with downturned lips.

Originally, such tubular section structural members were made in gauges from 0.060" to a maximum gauge of 0.160", with a "bulb" of 1¼" height. Since a deeper bulb permits practical utilization of heavier gauge steel, a 3-inch deep section was later developed using a maximum gauge of 0.230". This is the heaviest gauge in the hot rolled sheet classification, and also, for all practical purposes is the heaviest gauge sheet which may be coiled and uncoiled as is desirable in the manufacture of such structural members.

Thus, in the 3-inch deep "V-section" as compared with the original 1¼" section, applicant gained not only the additional area in the "bulb" as a result of increased depth and heavier gauge, but also gained a wider flange allowance due to the heavier gauge metal used in the fabrication thereof.

Such tubular, or "V-section," structural members are commonly utilized as chords in fabricated steel joists, beams, girders and other fabricated structural members in which spaced top and bottom chords are connected by an intervening open-web system. It will be evident that the capacity of such fabricated members is limited by the maximum dimensions, strength and capacity of the "V-sections" utilized as chords therein.

Therefore, these 3-inch deep "V-sections" are not suitable for use as chords in extremely long trusses, girders, beams, long-span joists and similar large heavy fabricated structural members.

My copending application above referred to discloses a method of making laminated tubular section structural members of plural strips of steel so as to be of sufficient capacity for use as chords in such large heavy fabricated structural members, the several steel strips being attached together by spot-welding, or by punching and plugging.

An additional operation was requried in the disclosure of said copending application to weld the leading ends of the steel strips together prior to entering the forming mechanism, and further operations were required to spot-weld the steel strips together at their longitudinal centers and to spot-weld the flanges and the downturned terminal edges thereof together during or after the forming operation.

Or, as an alternative, the steel sheets were connected together at their longitudinal centers, and the flanges and downturned edges thereof, in the formed structural member, were connected together by punching and plugging.

Such operations required considerable time and labor, and added considerably to the cost of producing the laminated tubular section structural members.

Subsequent to the filing of my copending application above referred to, I have discovered that the manufacture of laminated tubular section structural members may be simplified, the cost thereof considerably reduced, and the time and labor required for forming the same may be considerably shortened, by omitting the various welding, or punching and plugging, operations, and by connecting the superposed steel strips together by plastic adhesive applied prior to the forming operation.

Plastic adhesives which will securely join metal sheets, or other metal articles, together have recently been made available. Such plastic adhesives may be obtained in various forms, such as a paste dispensed in collapsible tubes which may be spread upon opposed surfaces of metal articles to be joined together, a liquid which may be sprayed or otherwise applied to the opposed metal surfaces, and in the form of thin sheets or strips of plastic adhesive material which may be placed between the metal surfaces to be joined together.

Certain of these plastic adhesive materials will function to securely join the metal articles together merely by the application of pressure to the metal articles with the plastic adhesive located therebetween, and certain other of these plastic adhesives require the application of both pressure and heat.

It is therefore an object of the invention to provide a method of forming laminated tubular or "V-section" structural members which includes the placing of a lamination of plastic adhesive between the superposed steel strips and applying pressure, and if necessary heat, during the forming operation, to securely join the steel laminations together, so as to economically produce laminated tubular section structural members of sufficient capacity for use as chords in large heavy fabricated structural members such as trusses, girders, etc.

Another object of the invention is to provide such a method which consists in placing a thin sheet of plastic adhesive material between two superposed steel strips and forming the same under pressure to the desired laminated tubular section structural member.

A further object of the invention is to provide a method of the charatcer referred to, which consists in spraying a liquid plasitc adhesive upon one or both opposed surfaces of the steel strips and then placing the steel strips in superposed position and forming the laminated structural member under pressure.

A still further object of the invention is to provide such a method, which consists in applying plastic adhesive in paste form to the opposed surfaces of the steel strips and then forming the superposed steel strips, with plastic adhesive therebetween, under pressure, to the desired structural shape.

Another object of the invention is to provide a method of this character which consists in placing a lamination of plastic adhesive between superposed steel strips and forming to desired shape under pressure and heat.

The above objects together with others which will be apparent from the drawings and following description, or which may be later referred to, may be attained by forming laminated tubular section members by the novel method hereinafter described in detail and illustrated in the accompanying drawings.

In general terms, the invention may be briefly described as comprising a method of forming laminated tubular section structural members, which consists in applying plastic adhesive between plural steel strips, and then forming the laminated structure, under pressure, to produce a laminated tubular or "V-section" structural member suitable for use as a chord in a truss, girder or other large heavy fabricated structural member.

The invention may be carried out by placing a thin sheet strip of plastic adhesive between two strips of hot-rolled steel, and then feeding the laminated sheet structure through a forming apparatus in which pressure, and if desired heat, is applied to form the laminated sheet structure into a laminated tubular section structural member, and to simultaneously cause the plastic adhesive to set so as to securely join the steel laminations together.

The invention may also be carried out by spraying, or otherwise applying, liquid plastic adhesive to the opposed surfaces of the steel strips, then placing the steel strips together with the plastic adhesive therebetween and passing the laminated sheet structure through the forming apparatus.

If it is desired to use the plastic adhesive in paste form in carrying out the invention, the same may be spread upon one or both of the opposed surfaces of the steel strips, after which the steel strips are placed together and formed to desired shape under pressure, as above referred to.

In the forming operation, the longitudinal central portion of the laminated sheet structure is formed into substantially triangular tubular or "bulb" shape, with oppositely disposed flat flanges at the top of the "bulb" and terminating in downturned terminal edges.

During this forming operation, a longitudinal nailing groove is formed at the top or apex of the triangular "bulb," and welds may be placed at spaced points therein to hold the groove to a predetermined definite width.

The several laminations of strip steel forming the completed laminated tubular or "V-section" structural member are securely joined together by the plastic adhesive located therebetween. The pressure applied to the steel laminations by the forming rolls is sufficient to "set" certain of said plastic adhesive materials.

The heat generated by friction in the forming apparatus is sufficient to set certain of said plastic adhesives which require both pressure and heat. If still higher temperatures are required to set certain of the plastic adhesives, additional heat may be applied, in any well known manner to the laminated structure as it passes through the forming apparatus.

Having thus briefly described the improved method of forming laminated tubular section structural members, reference is now made to the accompanying drawings, in which;

FIG. 1 is a perspective view of a portion of a laminated tubular section structural member made by the improved method to which the invention pertains;

FIG. 2 is a transverse sectional view through two superposed hot-rolled steel strips with plastic adhesive therebetween, preparatory to being passed through the forming apparatus;

FIG. 3 is a transverse sectional view through the laminated structure after the initial forming operation;

FIG. 4 is a transverse sectional view through the partially completed product after the "bulb" forming operation;

FIG. 5 is a transverse sectional view through the completed laminated tubular section structural member formed by the improved method;

FIG. 6 is a view similar to FIG. 5, of a completed laminated tubular section structural member formed by an alternative method of applying spaced bands or spots of plastic adhesive in paste form between the superposed steel strips;

FIG. 7 is an enlarged detail elevation showing the hot-rolled steel strips as they are uncoiled and fed to the forming apparatus, and showing tube means for applying plastic adhesive in paste form to the opposed surfaces of the steel strips;

FIG. 8 is a view similar to FIG. 7, showing means for spraying liquid plastic adhesive upon opposed surfaces of the steel strips; and FIG. 9 is a diagrammatic view showing the forming apparatus and means for interposing a thin sheet of plastic adhesive material between the steel strips as they are uncoiled and fed into the forming apparatus.

Referring now more particularly to the embodiment of the invention illustrated in the accompanying drawings, in which similar reference characters refer to like parts throughout, the laminated tubular section structural member formed by the improved method to which the invention pertains, is formed of two hot-rolled steel strips, the combined thickness of which may be between 0.230 inch and 0.460 inch.

Either one, or both, of the hot-rolled steeel strips from which the laminated tubular section structural member is formed by the improved method, may be of a maximum gauge of 0.230 inch. The two hot-rolled steel strips from which the laminated structural member is formed are indicated generally at 10 and 10a.

The upper steel strip 10 should be of somewhat greater width than the lower strip 10a, as shown in FIG. 2, in order to compensate for the lateral movement of the strips relative to each other during the forming operation, so that the lateral edges of the strips may be flush when the laminated tubular section structural member is completed.

In carrying out the improved method to which the invention pertains, a film of plastic adhesive material, as indicated at 11, is interposed between the opposed faces of the superposed steel strips 10 and 10a, as shown in FIG. 2.

This laminated sheet structure is then passed through the apparatus shown diagrammatically in FIG. 9, wherein it is formed into the laminated tubular section structural member of desired cross-sectional shape. In this figure the steel sheets are shown as joined together by plastic adhesive in strip form, introduced between the steel strips as they are uncoiled and fed into the forming apparatus.

Referring now particularly to FIG. 9, coils of hot-rolled strips, as indicated at 10' and 10a', are located in suitable coil boxes at the charging end of the forming apparatus, with a coil of plastic adhesive sheet material located therebetween, as indicated at 11'.

The steel strips 10 and 10a and the plastic adhesive strip 11 are withdrawn from the coils 10', 10a', and 11' respectively, and are placed in superposed position with the plastic adhesive strip 11 located between the steel strips 10 and 10a.

In this relative position, shown enlarged in FIG. 2, the laminated strip structure is passed through the apparatus shown in FIG. 9. First, the laminated strip structure is passed through the side guides, indicated generally at 12, then between the power rolls 13 and 14 which advance the laminated strip structure through the side guides 15 and then into the forming mill indicated at 16.

This forming mill includes a plurality of forming rolls indicated diagrammatically at 17, which form the superposed steel strips 10 and 10a, with plastic adhesive film 11 therebetween, progressively as shown in FIGS. 3, 4 and 5.

First, the longitudinal central portion of the laminated strips is formed into substantially U-shape, as indicated at 18 in FIG. 3, after which the upper ends of the U are bent toward each other forming the substantially triangular "bulb" 19, as shown in FIG. 4. The terminal edges of the combined strips are then bent down forming the terminal flanges 20 upon the horizontal oppositely disposed flanges 21 in the completed tubular section structural member, as shown in FIG. 5.

The formed laminated tubular section structural member, as indicated generally at 22 in FIG. 9, then passes through the sliding cut-off shear indicated generally at 23, where it may be cut into sections of any desired length and is ready for use as chords in trusses, girders or other large, heavy fabricated structural members.

The pressure of the forming rolls 17 is sufficient to set certain of the plastic adhesives so as to securely join the steel strips together in the finished laminated tubular section structural member.

If the plastic adhesive material is of the type which requires some heat in addition to pressure, in order to cause the same to set, sufficient heat for the purpose may be generated by friction between the forming rolls 17 and the laminated sheet steel structure passing therethrough.

Where more heat is required to cause the plastic adhesive to set, than may be generated by friction in the roll-forming apparatus, additional heat may be applied to the laminated sheet structure as by burners or the like, indicated at 24 in FIG. 9.

The several laminations of sheet steel forming the completed tubular or "V-section" structural member are thus securely joined together by the plastic adhesive material located therebetween.

The improved method of making laminated tubular section structural members may be carried out with the use of plastic adhesive in paste form, as shown in FIG. 7. For this purpose, a collapsible tube of plastic adhesive in paste form, as indicated at 25, is supported in upright position, between the coils 10' and 10a' of hot-rolled steel strips, as upon the upright support member 26, with the nozzle 27 of the tube located directly beneath the upper steel strip 10.

Any suitable means may be provided for squeezing the plastic adhesive paste from the tube 25 onto the under surface of the upper steel strip 10. For the purpose of illustration, this means is shown as a roller 28 journalled upon an arm 29 fixed upon the nut 30 which is threaded upon the revolvable vertical screw 31.

This screw is journalled at opposite ends in the upper and lower bearings 32 and 33 respectively, and may be rotated at a uniform speed by any usual and well known means, such as a sprocket wheel 34 upon the screw operated by a conventional sprocket chain drive connected to suitable power means.

As the screw 31 is rotated, the roller 28 will be slowly moved upward, in contact with the tube 25, squeezing the plastic adhesive paste from the nozzle of the tube and depositing it in a thin film upon the underside of the moving steel strip 10, as indicated at 11a.

It will be understood that this film of plastic adhesive will be in the form of a relatively narrow strip or band extending longitudinally of the steel strip and being received between the strip 10 and 10a as indicated at 11.

Also, it is pointed out that, while only one tube of plastic adhesive paste is shown in FIG. 7, similar tubes of the paste material will be located in any desirable or necessary spaced relationship, transversely throughout the width of the steel strip 10, so as to simultaneously deposit a plurality of spaced bands or strips of plastic adhesive paste upon the underside of the steel strip 10, in any desired spaced relationship.

In the same manner as above described, the plastic adhesive paste may be applied to the top surface of the lower steel strip 10a by collapsible tubes as indicated at 25a in FIG. 7, which may be operated by mechanism such as shown associated with the tube 25, and above described in detail.

The tubes 25a may be used in combinations with the tubes 25, for applying the adhesive paste to opposed surfaces of both of the steel strips, as shown in FIG. 7, or only the tubes 25 or the tubes 25a may be used to apply the adhesive only to the opposed surface of the upper steel strip 10 or the lower steel strip 10a, so as to provide a plastic adhesive lamination between the two steel strips as they are passed into the forming apparatus.

Thus the bands or strips of this paste material may be widely spaced apart as indicated at 11" in FIG. 6, or they may be located so closely together that under the pressure of the forming rolls the plastic adhesive paste will be spread over the entire opposed surfaces of the steel strips.

If desired, the mechanism for squeezing the paste material from the tubes may be operated intermittently instead of continuously, so as to apply the plastic adhesive paste to the steel strip 10 at longitudinally spaced spots rather than in continuous bands or stripes.

In FIG. 8 is shown means for spraying liquid plastic adhesive upon the opposed surfaces of the steel strips as they are uncoiled and passed toward the forming mill. For this purpose, a pipe 36 conveys liquid plastic adhesive under pressure to one or more spray nozzles 37 which direct a spray 38 of the liquid material upon the underside of the steel strip 10, forming a film 39 of plastic adhesive thereon.

If desirable or necessary, one or more nozzles 37a may communicate with the supply pipe 36, for directing a spray 38a of the liquid material upon the upper surface of the steel strip 10a, as it is uncoiled, forming a film 39a upon said surfaces. These films 39 and 39a of the liquid plastic adhesive will then merge, forming the lamination 11 of plastic adhesive between the hot-rolled steel strips.

It should also be understood that the apparatus for practicing the improved method, with the use of paste or liquid plastic adhesive, is otherwise the same as illustrated in FIG. 9 and above described in detail.

Laminated tubular section structural members of any given total thickness, made in accordance with the above-described method, may be roll formed with considerably less power than a single ply structural member of the same given thickness.

By omitting the welding and/or the punching and plugging operations, disclosed in my copending application above referred to, and substituting therefor the application of plastic adhesive to the opposed surfaces of the steel strips, the laminated tubular section structural members may be produced more quickly and economically.

Therefore, while the laminated structural member was developed in order to produce larger and heavier structural members than the single-ply structural members of present practice, the invention is not limited to such large, heavy structural members, but includes the laminated structural members formed from a plurality of sheets of gauges in the hot-rolled sheet classification, regardless of the combined thickness of the laminations.

Thus, while for the purpose of illustration, the structural member is shown as formed of only two hot-rolled sheets, it should be understood that the laminated structural member may be formed from two or more hot-rolled sheets.

From the above it will be seen that the laminated tubular section structural member constructed in the manner herein disclosed may be of greatly increased capacity. Such laminated structural members may be of considerably greater depth than is possible under present practice where such members are formed from a single thickness of hot-rolled strip, and the flange width may greatly exceed the maximum flange width under present practice.

It will also be evident that these laminated structural members are formed of hot-rolled strips which may be coiled and uncoiled as is necessary and desirable in the manufacture of such products.

It will also be seen that the laminated structural member may be formed to desired shape with considerably less power than would be required in the bending and forming of a single-ply steel plate of a gauge equal to the combined thicknesses of the two steel strips from which the laminated structural member is formed.

Laminated structural members made in this manner would be suitable for use as chords in heavy trusses, girders, beams and long-span joists for which purposes the single-ply V-sections of present practice cannot be used. This is possible because the laminated structural member permits doubling in structural effect the maximum gauge of hot rolled steel sheet available.

It will also be evident that this laminated structural member functions without slippage between the two strips of which it is formed when submitted to maximum moment stresses under loading of built-up truss members or the like in which the laminated structural members form the chords.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of making a laminated tubular section structural member which comprises applying pressure sensitive plastic adhesive to at least one opposed surface of two strips of hot-rolled sheet steel, superposing the hot-rolled strips with the plastic therebetween, the edges of the lower strip being spaced inwardly from the edges of the upper strip, moving the composite strip longitudinally, roll-forming the longitudinal central portion intermediate the longitudinal edges of the moving composite strip downwardly into U-shape, then roll-forming the U-shape portion of the moving composite strip into substantially tubular shape with a groove in the top side thereof, and roll-forming flat flanges on opposite sides of the groove with downturned terminal portions the longitudinal edges of which are flush, the roll-forming pressing the hot-rolled strips toward each other and setting the pressure sensitive plastic adhesive to securely join the hot-rolled strips together to form a laminated tubular section structural member, and deposit welding at spaced points in the entrance to the groove for rigidly holding the walls thereof to a predetermined spacing.

2. The method of making a laminated tubular section structural member as defined in claim 1, in which the plastic adhesive is also heat sensitive, and which includes the step of heating the moving composite strip during the roll-forming thereof.

3. The method of making a laminated tubular section structural member as defined in claim 1, in which the plastic adhesive is in the form of a thin sheet strip located between the two strips of hot-rolled sheet steel.

4. The method of making a laminated tubular section structural member as defined in claim 1, in which the plastic adhesive is applied in paste form to at least one surface of the hot-rolled steel sheets.

5. The method of making a laminated tubular section structural member as defined in claim 1, in which a liquid plastic adhesive is sprayed upon at least one opposed surface of the hot-rolled steel sheets.

References Cited in the file of this patent

UNITED STATES PATENTS

| | | |
|---|---|---|
| 860,385 | Jenkins | July 16, 1907 |
| 1,993,254 | Booth | Mar. 5, 1935 |
| 2,089,525 | Abrams et al. | Aug. 10, 1937 |
| 2,164,267 | Black | June 27, 1939 |
| 2,457,250 | Macomber | Dec. 28, 1948 |